US012579861B2

(12) United States Patent
Danielson et al.

(10) Patent No.: US 12,579,861 B2
(45) Date of Patent: Mar. 17, 2026

(54) METHODS OF AIR TRAVEL CASINO AND LOTTERY GAMING

(71) Applicant: IGT, Las Vegas, NV (US)

(72) Inventors: Patrick Danielson, Las Vegas, NV (US); Dwayne Nelson, Las Vegas, NV (US); Kevin Higgins, Reno, NV (US); Jason Ingles, North Las Vegas, NV (US)

(73) Assignee: IGT, Las Vegas, NV (US)

( * ) Notice: Subject to any disclaimer, the term of this patent is extended or adjusted under 35 U.S.C. 154(b) by 187 days.

(21) Appl. No.: 18/331,721

(22) Filed: Jun. 8, 2023

(65) Prior Publication Data

US 2024/0412589 A1 Dec. 12, 2024

(51) Int. Cl.
*G07F 17/32* (2006.01)

(52) U.S. Cl.
CPC ........ *G07F 17/3227* (2013.01); *G07F 17/323* (2013.01); *G07F 17/3258* (2013.01)

(58) Field of Classification Search
CPC . G07F 17/3227; G07F 17/323; G07F 17/3258
See application file for complete search history.

(56) References Cited

U.S. PATENT DOCUMENTS

| | | | | | |
|---|---|---|---|---|---|
| 4,023,414 | A * | 5/1977 | Bone | G01C 5/06 | 116/271 |
| 9,552,693 | B1 * | 1/2017 | Reeves | G07F 17/3239 | |
| 2003/0224854 | A1 * | 12/2003 | Joao | G07F 17/3244 | 463/40 |
| 2004/0082384 | A1 * | 4/2004 | Walker | G07F 17/3239 | 463/40 |
| 2012/0322561 | A1 * | 12/2012 | Kohlhoff | A63F 13/216 | 463/42 |
| 2015/0302482 | A1 * | 10/2015 | Vagner | G06Q 30/0269 | 705/14.66 |
| 2017/0024961 | A1 * | 1/2017 | Arnone | G07F 17/3295 | |
| 2019/0080560 | A1 * | 3/2019 | Hawkins | G07F 17/3223 | |

* cited by examiner

*Primary Examiner* — Werner G Garner
(74) *Attorney, Agent, or Firm* — Sage Patent Group

(57) ABSTRACT

Systems and methods of air travel using a wagering game are provided. Operations include determining proposed route of an aircraft and identifying multiple geographical zones that include the proposed route of the aircraft and that each include different sets of jurisdictional policies corresponding to wagering games. Operations may include providing jurisdiction compliant wagering games to a passenger on the aircraft based on jurisdictional policies that correspond to one of the geographical zones.

17 Claims, 14 Drawing Sheets

METHODS OF AIR TRAVEL CASINO AND LOTTERY GAMING

BACKGROUND

As communication technologies improve, increasing connectivity may allow players to participate in many activities in locations that may have previously been unavailable. For example, recreational gaming may be available to multiple players that are not in the same location as one another. However, some activities may be unavailable due to jurisdictional limitations. Such activities may include wager-based gaming and such jurisdictional limitations may be inconsistent during travel.

There is a need for providing games in previously unavailable or dynamic venues.

BRIEF SUMMARY

According to some embodiments, a system includes a processor circuit and a memory including machine-readable instructions. When executed by the processor circuit, the instructions cause the processor circuit to operations disclosed herein. Operations include determining three-dimensional (3D) airspace location data corresponding to an aircraft. Operations further include, based on the 3D airspace location data, determining jurisdictional policies regarding providing a jurisdiction compliant wagering game to an aircraft passenger and providing one of the jurisdiction compliant wagering games to the aircraft passenger.

Some embodiments herein are directed to methods that perform operations discussed herein. Operations include determining proposed route of an aircraft and identifying multiple geographical zones that include the proposed route of the aircraft and that each include different sets of jurisdictional policies corresponding to wagering games. Operations may include providing jurisdiction compliant wagering games to a passenger on the aircraft based on jurisdictional policies that correspond to one of the geographical zones.

According to some embodiments, a gaming device includes a display device, an input device, a processor circuit, and a memory including machine-readable instructions. When executed by the processor circuit, the instructions cause the processor circuit to determine three-dimensional (3D) airspace location data corresponding to an aircraft. The processing circuit is further caused to, based on the 3D airspace location data, determine jurisdictional policies regarding providing jurisdiction compliant wagering games to an aircraft passenger. The processing circuit is further caused to provide one of the jurisdiction compliant wagering games to the aircraft passenger. In some embodiments determining the 3D airspace location data causes the processing circuit to further determine multiple geographical zones that include a first geographical zone and a second geographical zone that is different from the first geographical zone. The first geographic zone includes a first set of jurisdictional policies and the second geographic zone includes a second set of jurisdictional policies that are different from the first set of jurisdictional policies. In some embodiments, the first geographical zone includes a first altitude that is above a threshold altitude and the second geographical zone includes a second altitude that is below the threshold altitude.

Some embodiments provide that the processing circuit is further caused to determine that the aircraft will be travelling from the first geographical zone to the second geographical zone. Some embodiments include providing a message, via the communication interface, that informs the aircraft passenger that the first set of jurisdictional policies will not apply and that the jurisdiction compliant wagering games will be provided according to the second set of jurisdictional policies.

DETAILED DESCRIPTION

Methods and techniques provided herein may allow airline passengers to participate in casino and lottery gaming when over the respective airspace in jurisdictions, where allowed. This may include the types of devices that can play these games, theme libraries and content, and how to connect to central determination systems connected to lotteries. While using geolocation information though a GPS or the aircraft triangulation/transponder, an appropriate gaming method can apply over the appropriate airspace of the current aircraft position. Methods can be applied that: start and end sessions based on geo-location; dynamically change libraries for appropriate areas, presentation and library change presented and funds escrow through border, provide online, offline, or a combination of both when and where appropriate, and apply financial transfers between class ii and class ii jurisdictions. Such financial transfers may be implemented using conventional payment services such as a private party payment system, cashless, and/or Apple Pay, among others. In some embodiments, player tracking may be implemented if permitted. Some embodiments provide that sports betting, historic horse racing and/or other gaming types may be allowed.

Figure 3:
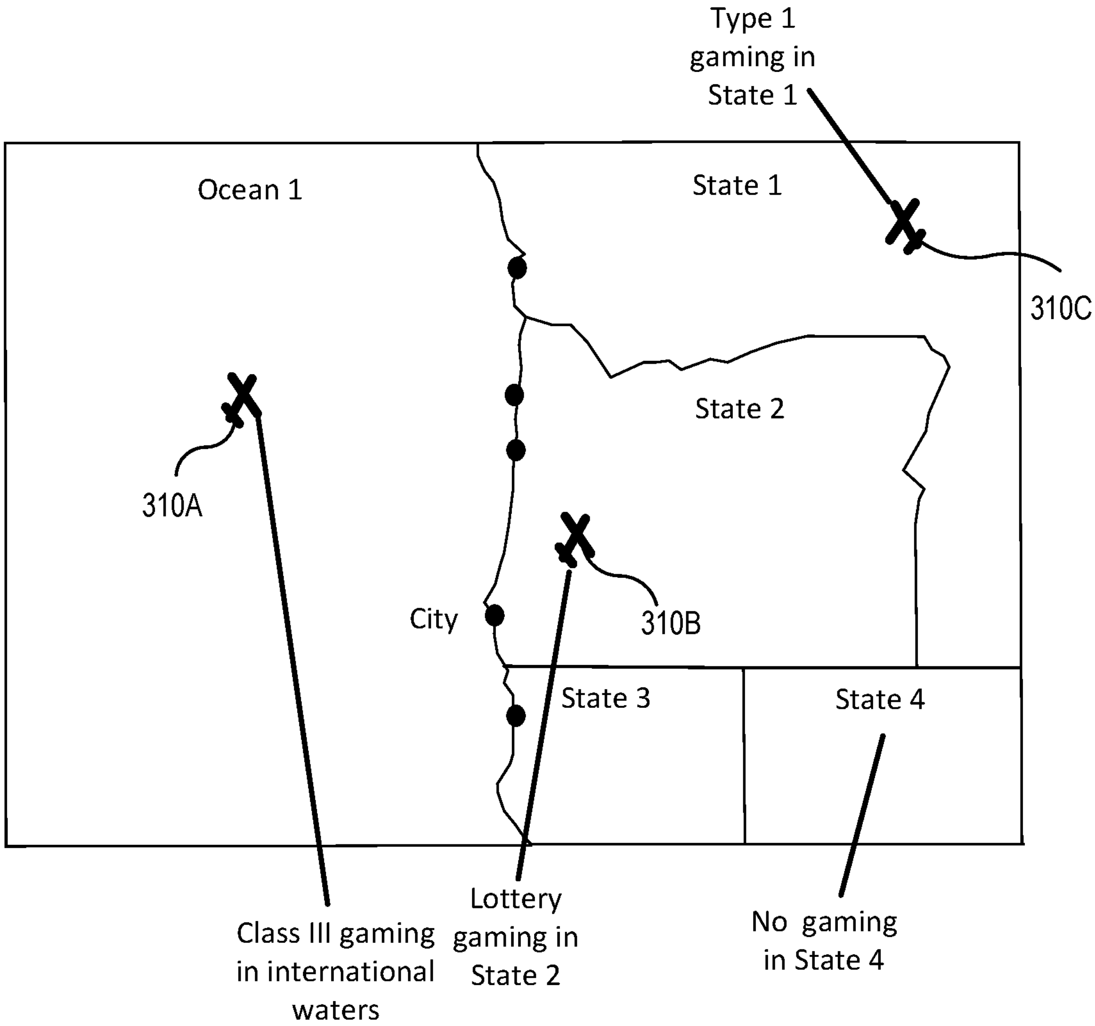
FIG. 3 is a schematic map representation illustrating aircraft positions over geographical areas having different gaming jurisdictions according to some embodiments.

Brief reference is made to FIG. 3, which is a schematic map representation illustrating aircraft positions over geographical areas having different gaming jurisdictions according to some embodiments herein. As illustrated, the map identifies an example of international waters in Ocean 1, States 1-4 and cities located on the coastline of States 1, 2 and 3. Further, aircraft icons 310A, 310B, 310C illustrating locations of multiple aircraft in different ones of the geographical locations. A compliant jurisdictional gaming system as provided herein, may provide different gaming practices to aircraft 310A, 310B, 310C based on the rules/laws that apply in the jurisdiction corresponding to respective geographies.

For example, while aircraft 310A is geographically located in international waters in Ocean 1 which apply. In this regard, the gaming rules that apply to aircraft 310A in the Ocean 1 geography may be a class of gaming rules that are specific to being in international waters. As such, while aircraft 310A is located in the international waters, these rules apply. Continuing with the example, for the duration of time that aircraft 310B is in State 2, then the lottery rules corresponding to State 2 may apply to the passengers of aircraft 310B. Additionally, while aircraft 310C is in the geography of State 1, then for the duration of time that aircraft 310C is in State 1, the then the type of gaming permitted in State 1 may apply to the passengers.

While some embodiments herein provide geographies that are described in terms of states, such descriptions are non-limiting embodiments as the geographies may be defined in the context of jurisdictions, areas, precincts, provinces, countries, territories and/or other defined geographies, among others.

Although some embodiments are described herein in the context of aircraft, such descriptions are non-limiting as vehicles herein may be terrestrial vehicles, watercraft and/or airborne vehicles. For example, vehicles may include trains, trucks, cars, buses, boats, helicopters, and/or other aircraft, among others.

Some embodiments provide that devices such as rear-seat consoles, tablets, and/or mobile devices can host the content while connected over Wi-Fi or Bluetooth communications to a local aircraft host server, which can then be connected over the aircraft network through secure communications channels.

In some embodiments provide that a device may include a virtual (VR and/or augmented reality (AR) devices can be used to simulate a full-size gaming machine on the back of the player's chair to simulate a full casino or lottery experience or change the scenery altogether.

Figure 4:
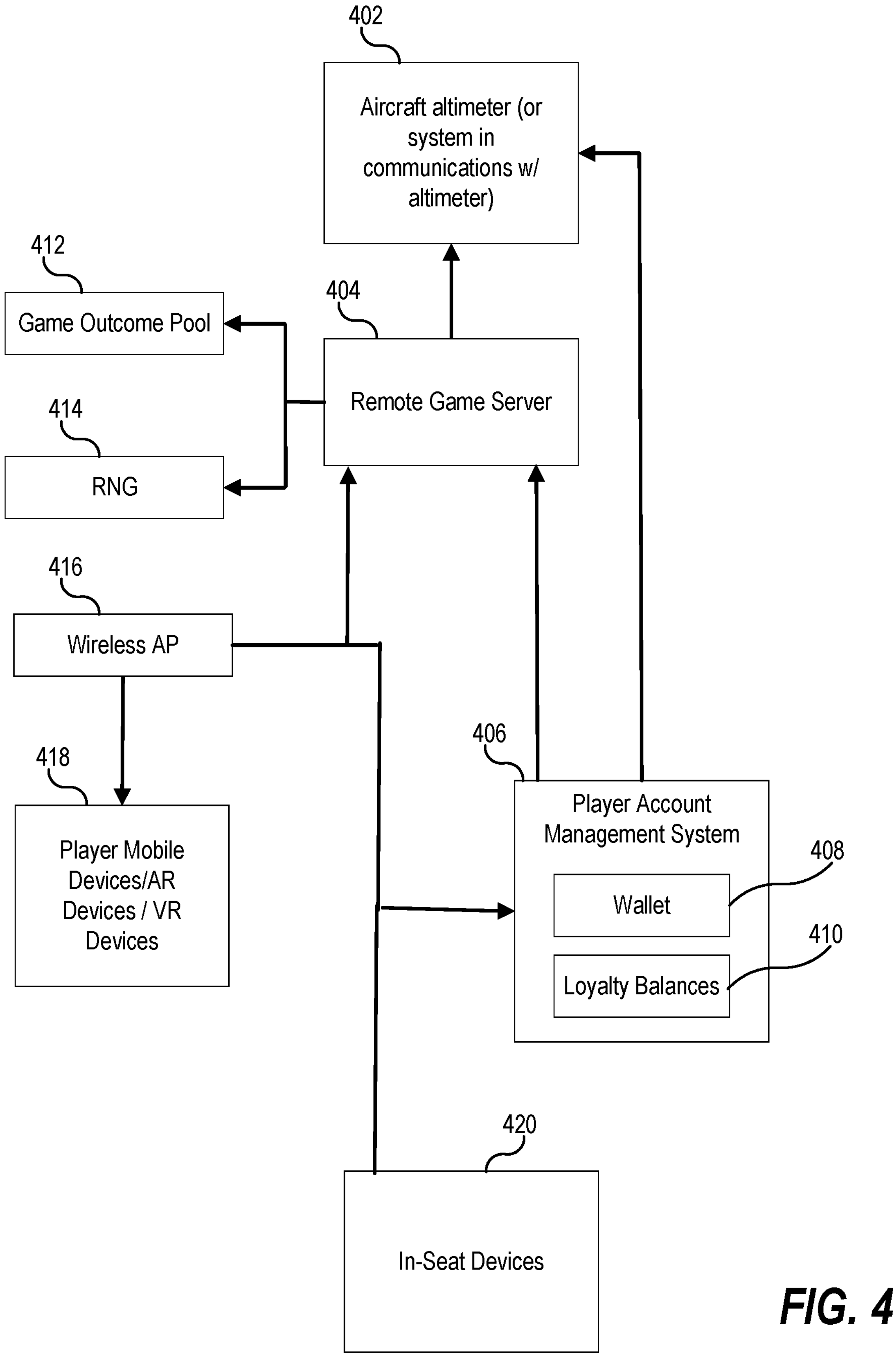
FIG. 4 is a schematic block diagram illustrating an example architecture of a system disclosed herein according to some embodiments.
Figure 5:
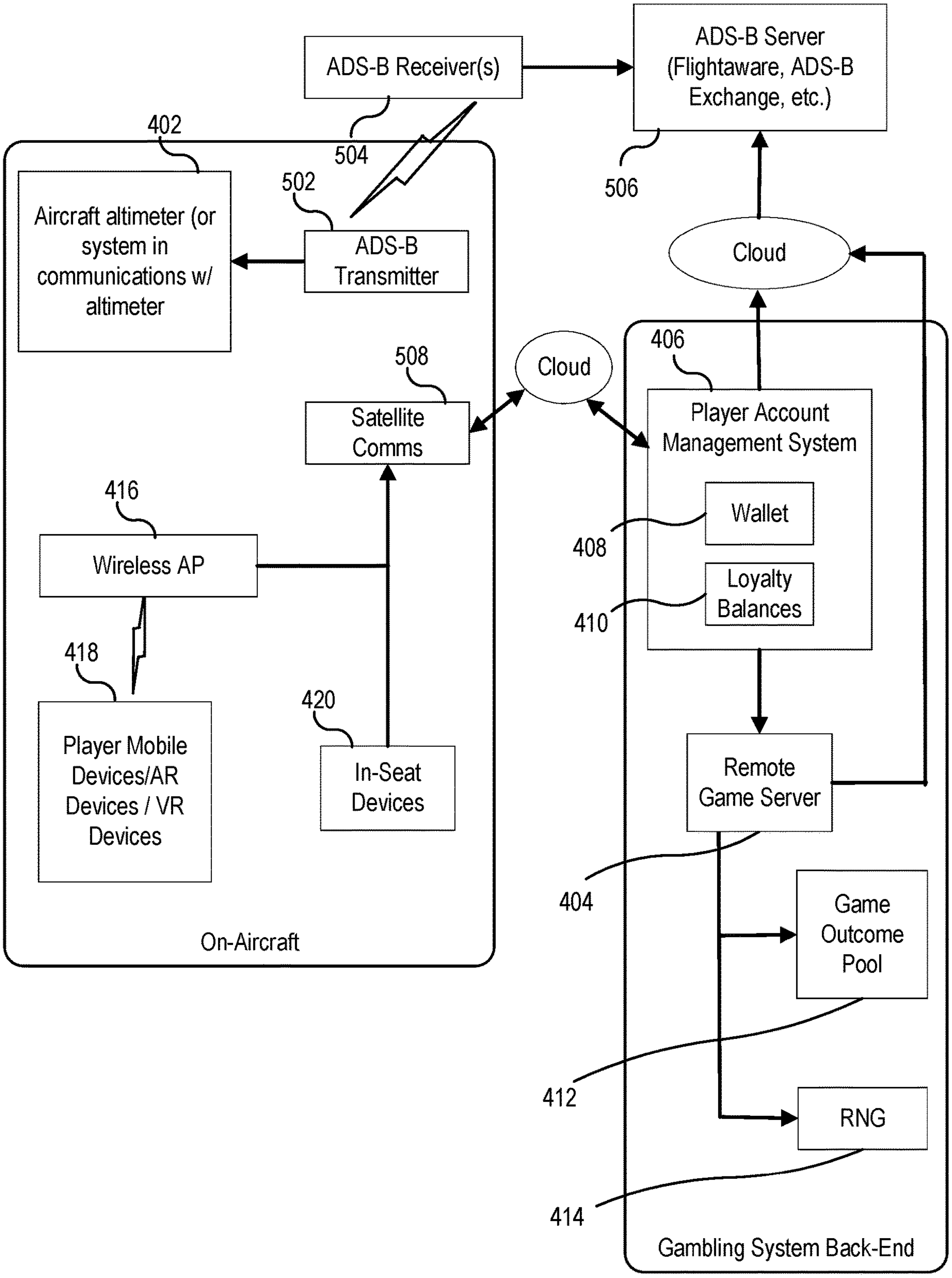
FIG. 5 is a schematic block diagram illustrating an example architecture of a system disclosed herein according to some embodiments.

Brief reference is now made to FIGS. 4 and 5, which are schematic block diagrams illustrating example architectures of different systems disclosed herein according to some embodiments. In both example architectures, various servers that comprise the gambling system (e.g., remote game server 404, which is responsible for hosting games, or the player account management system 406, which is responsible for hosting player accounts and their wallet balances 408 and/or loyalty balances 410) are in communications with a component that can inform the respective systems (and their appropriate sub-components) of the state of the aircraft.

Referring to FIG. 4, the player account management server 406 may communicate with the aircraft altimeter 402 and/or a system that is in communication with the altimeter 402 the remote game server 404 may use the random number generator (RNG) 414 and/or a game outcome pool 412 to determine the outcome of games that may be provided to player mobile devices, AR devices and/or VR devices 418 and/or in-seat devices 420.

Still referencing FIG. 4, this architecture may be illustrated this by including the on-aircraft components being in communications with the aircraft's altimeter, or a component that is ultimately in communications with the aircraft's altimeter. In some embodiments, the gaming system could be in communications with a GPS receiver of the aircraft, or its own GPS receiver, or another component which is ultimately in communications with the GPS receiver of the aircraft.

Referring to FIG. 5, off-aircraft, cloud hosted components by being in communication with a data service (such as FlightAware, or other appropriate flight data provider) so that the components of the system can make decisions on what to allow or not allow based upon the geo-location and/or altitude of the aircraft. FIG. 5 includes numerous elements in common with FIG. 4, the discussion of which will not be discussed for brevity. FIG. 5 further comprises Automatic Dependent Surveillance-Broadcast (ADS-B) elements that are an advanced surveillance technology that combines an aircraft's positioning source, aircraft avionics and ground infrastructure to create an accurate surveillance interface between aircraft and ATC. For example, the architecture of FIG. 5 includes an ADS-B receiver 504, ADS-B transmitter 502 and ADS-B server 506 and/or satellite communication devices 508.

Figure 6:
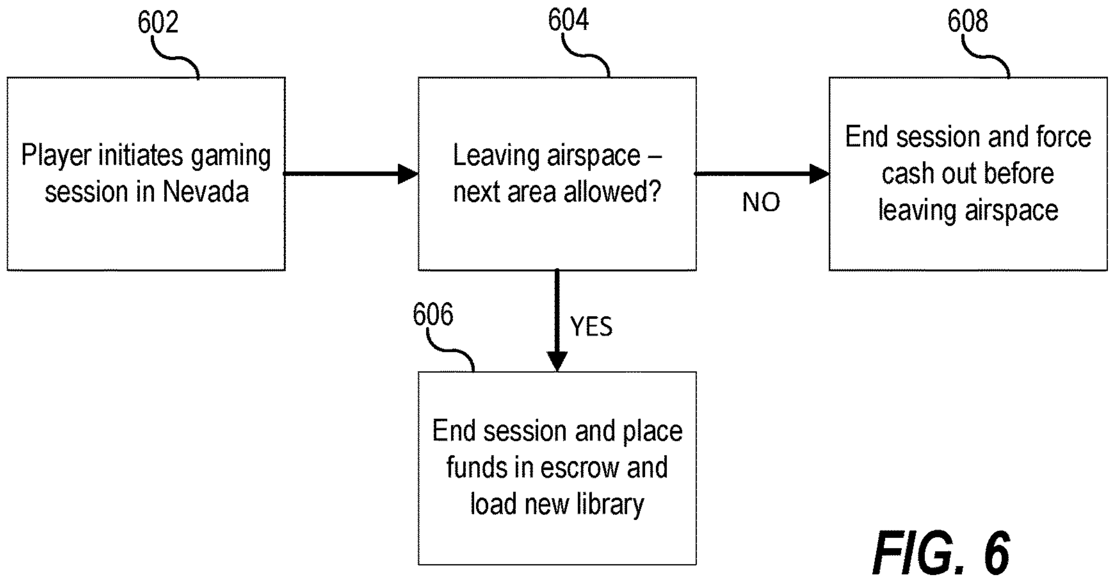
FIG. 6 is a schematic block diagram illustrating changing libraries and/or adhering to jurisdictional rules in airspace in an example in accordance with some embodiments.

A variety of methods can be used to apply this technology. For example, brief reference is made to FIG. 6, which is a schematic block diagram illustrating changing libraries and/or adhering to jurisdictional rules in airspace in an example in accordance with some embodiments. In the present example, the player initiates (block 602) a gaming session in a state such as, for example, Nevada. In response to determining that the aircraft will be leaving (block 604) the airspace over Nevada, it is determined as to whether the gaming session is allowed in the next area. If the next geolocation that the aircraft will be in does not permit the gaming activities, then the gaming session may be ended (block 608) and a cash out of the gaming session is forced before leaving the current airspace. If the next geolocation does permit gaming the current gaming session may be ended (block 606) and the funds may be placed into escrow and a new gaming session library corresponding to the next geolocation may be loaded for the player.

In some embodiments, the system may anticipate the entering or leaving jurisdictional airspace and act accordingly. For example, before entering Nevada, the system might prompt the player to create an account or pick games in anticipation of being over Nevada. Then while getting close to leaving Nevada the system might stop or limit play, before leaving Nevada to prevent game play from extending outside Nevada. For example, the player is playing a game with a long bonus that lasts 2 minutes. The system disables play 2 minutes before leaving Nevada to avoid this problem.

Figure 7:
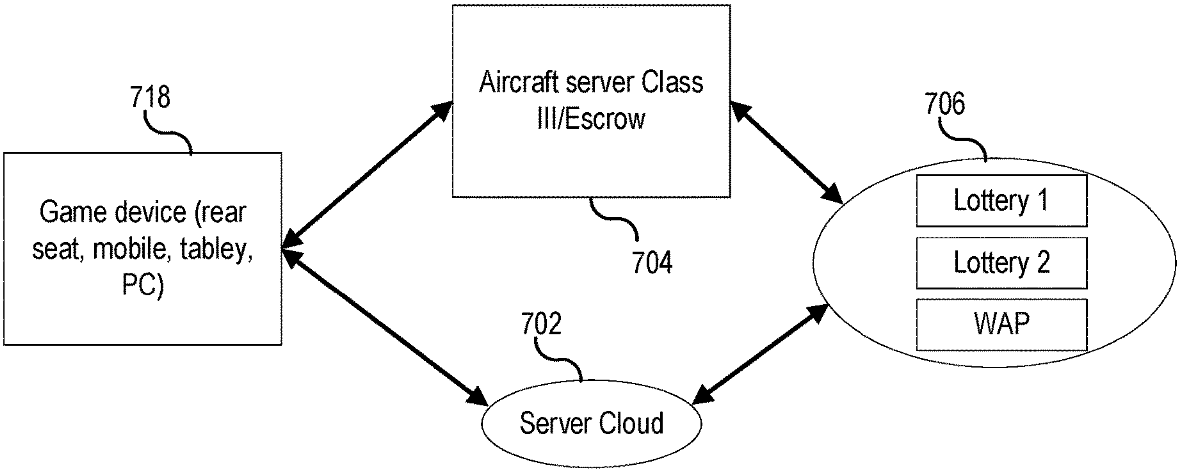
FIG. 7 is a schematic block diagram illustrating operations for communication methods according to some embodiments herein.

Brief reference is now made to FIG. 7, which is a schematic block diagram illustrating operations for communication methods according to some embodiments herein. A game device 718 may communicate with one or more remote game servers 706 that may provide one or more games and/or game types. Examples of such games and/or game types include different lottery and/or WAP types, among others. Examples include using different data types such as an aircraft server 704 for class III/escrow. In some embodiments, data may be communicated via a server cloud 702.

Figure 8:
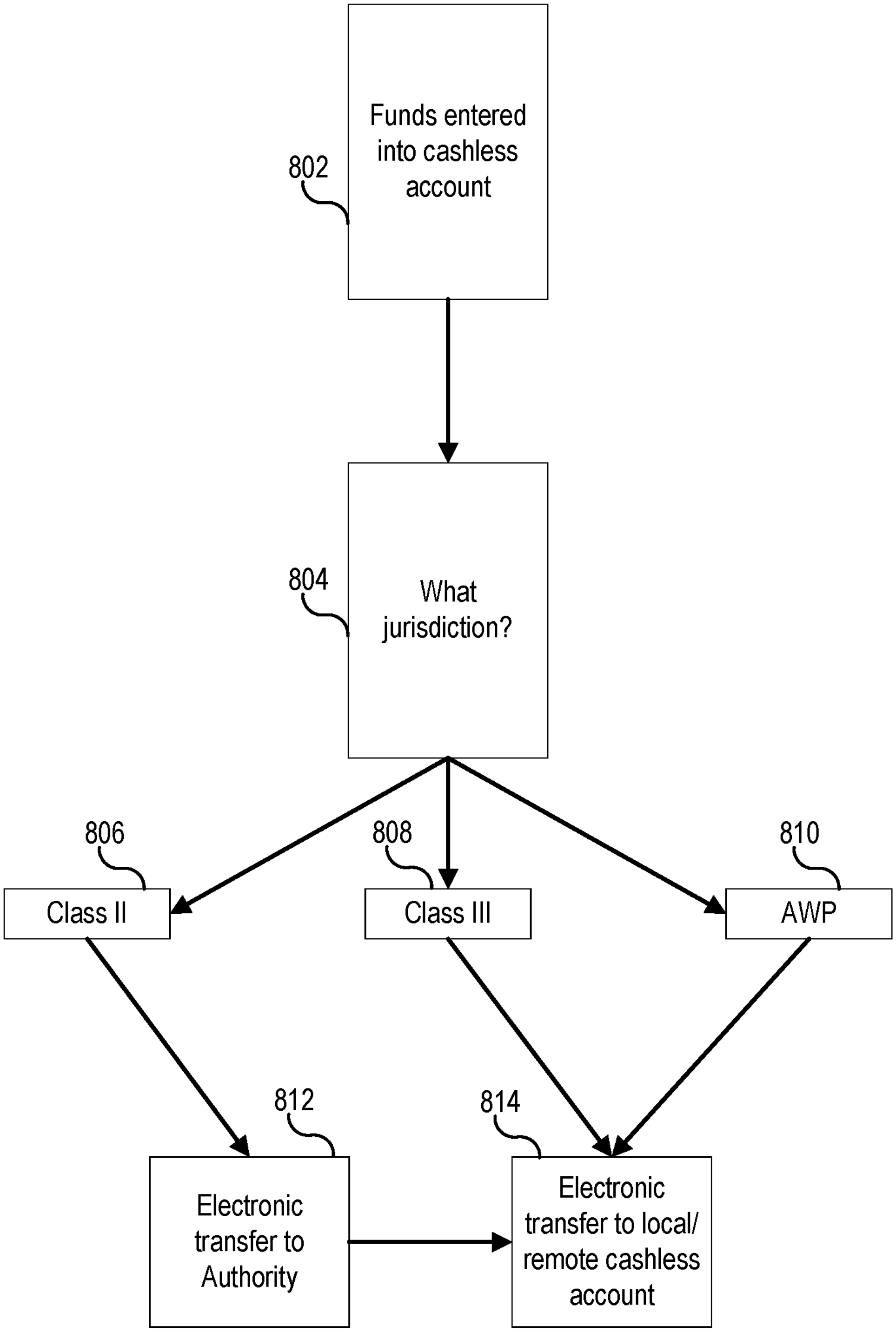
FIG. 8 is a schematic block diagram illustrating financial flows according to some embodiments herein.

Brief reference is now made to FIG. 8, which is a schematic block diagram illustrating financial flows according to some embodiments herein. Operations may begin when funds are entered into a cashless account (block 802). A determination (block 804) of which jurisdiction and/or type of jurisdiction applies is made and the financial data is transferred accordingly. For example, in the case of a Class II jurisdiction (block 806), an electronic transfer of funds is made to the governing authority (block 812). In some embodiments, an electronic transfer may be made (block 814) to a local and/or remote cashless account.

If the jurisdiction is a Class III jurisdiction (block 808), then an electronic transfer of funds may be made to the local and/or remote cashless account (block 814). Similarly, if the jurisdiction is a AWP (block 810), then an electronic transfer of funds may be made to the local and/or remote cashless account (block 814).

Operations corresponding to such methods may include the player initiating a gaming session, such as provided below. Examples of process concepts to functionally apply this disclosure are further discussed below.

Since the time that a player is in a particular jurisdiction may be limited, embodiments herein may present the players the highest paying games. For example, while flying over Nevada the players might be presented with Megabucks because its prize is large.

In some embodiments, when the player is not over a wagering jurisdiction, the player may be allowed to wager with an online account (instead of the airline account) for money and/or on a social account (non-money account such as Double Down).

In some embodiments, the selection of games may be a function of the player's seat and/or loyalty system tier status. For example, players sitting in first class seats may be able to select certain types of games, themes, paytables, and/or denominations, among others, that players sitting in lessor seats cannot access. In some embodiments, players sitting in higher tier status seats (or who may have a higher tier status in the airline's loyalty program) may be eligible for higher loyalty rewards when playing gambling games. For example, they may earn a higher ratio of points (for example, with a point multiplier), etc.

In some embodiments, community style games could be joined virtually by anyone in the flight. Some examples of such games may include Bingo, BlackJack, Roulette, Various Poker game themes such as Texas Hold'em.

In some embodiments, live sporting events may offer sports betting opportunities to anyone on the flight. Some embodiments provide that specific live wagers could be offered based on the sports betting feature. Players may watch these games on the flight provided displays, on the player's mobile device, and/or on the gambling device provided by the flight.

When the player enters and leaves the airspace of a jurisdiction, the session can be automatically started and ended (as previously described). In order to wager the player must have money that may be wagered. In some embodiments, the player's slot club and/or casino wagering accounts may be associated with their airline account such that the airline account is aware of the player's accounts in various states. When using the player loyalty and/or wagering accounts, the player can earn player points from the airline.

In some embodiments, the system may allow the player to create a wagering account from the airline. In some embodiments, the system may provide social play if a wagering account cannot be established.

In some embodiments, a flight attendant may be required to enable the headrest gaming responsive to passenger requests. Some embodiments provide that a flight attendant checks the age of the player using player provided identification and/or passenger data provided to the flight crew.

In some embodiments, the system determines where to enable the headrest gaming based on multiple factors. Such factors may include the presence of minors that may be proximate the wagering device. In some embodiments, headrest gaming devices that are adjacent minors may be disabled. For example, the system determines that the aircraft is flying over Nevada and gambling is allowed for those over the age of 21. In such embodiments, the system may disable gambling at headrests where passengers are under the age of 21 and/or at those headrests next to passengers under the age of 21.

In some embodiments, in certain jurisdictions, the airspace above a certain altitude and/or after the aircraft has left a gate at an airport may be considered a federal jurisdiction. For example, responsive to the airplane entering a federal jurisdiction upon encountering a certain altitude, such as 5000 feet above the airport it just took off from, then the gambling system on the aircraft, and/or the gambling system the aircraft is in communications with, may then enable the persons on that aircraft to be able to login to their accounts and begin gambling (assuming all other requirements are met).

In some embodiments, systems herein may learn about the altitude of the aircraft by connecting to the aircraft's altimeter data using a communications bus of some form so that it can determine when to allow play of a certain gambling game on the aircraft. In some embodiments a communication bus may include an ethernet-based communication bus, however, other types of communication buses are contemplated.

Figure 9:
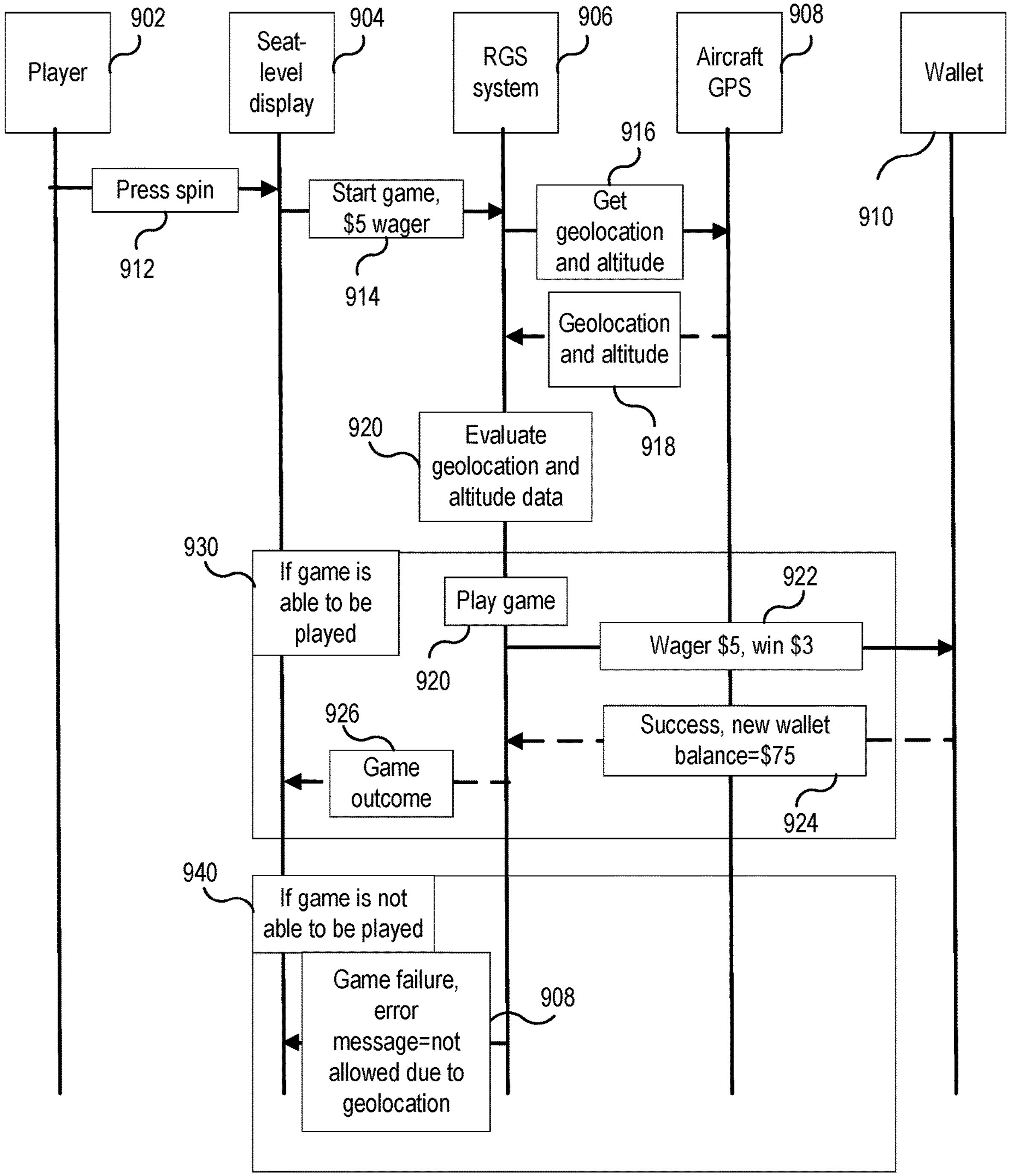
FIG. 9 is a schematic sequence diagram illustrating an example of an on-aircraft gambling system according to some embodiments herein.

Brief reference is now made to FIG. 9, which is a schematic sequence diagram illustrating an example of an on-aircraft gambling system according to some embodiments herein. The sequence may begin when a player 902 presses (block 912) a spin button or other type of input for initiating a wager and/or a wagering session at a seat-level display 904. The seat level display 904 may transmit instructions to start (block 914) a game including the amount (e.g., $5) of the wager to the remote game server (RGS) system 906.

The RGS system 906 may send a request (block 916) to the aircraft GPS 908 to get the geolocation and altitude. The aircraft GPS 908 may send (block 918) the geolocation and altitude data back to the RGS system 906. The RGS system 906 may evaluate (block 920) the geolocation and altitude data to determine if the game is able to be played on the aircraft.

If the geolocation and altitude data indicate that the game is able to be played (block 930) then the RGS system 906 may allow the player to play the game (block 920).

The game result (block 922) may be sent to a player wallet (block 910) or other electronic funds repository. For example, in the present example, the game result (block 922)

is a win of $3 on a wager of $5. The wallet (block 910) may send (block 924) an indication of the successful transaction and the new balance, which in the present example is a new wallet balance of $75.

If the geolocation and altitude data indicate (block 940) that the game is not able to be played (block 930) then the RGS system 906 may send an indication (block 908) that the game attempt failed and may include an error message that the wager is not allowed due to geolocation.

In some other embodiments, once the aircraft has safely departed and pulled back from the gate, then the gambling system on the plane, or gambling system that the devices on the aircraft are in communications with may then enable players on the aircraft to login to their accounts and begin gambling (assuming all other rules/requirements are met). For example, this may enable gambling games on a menu item of the in-seat device available on one or more seats on the aircraft. In some embodiments, a similar flow may be available to make gambling games unavailable for play and/or selection when the aircraft is no longer within the parameters that allow gambling, such as if the aircraft pulls up to a gate, or is no longer above a certain altitude at the destination airport, etc.

Some embodiments include operations for the player to register formally for an account and to fund the gambling wallet associated with their account in order to gamble on the aircraft. In some embodiments, the player may establish this account through a signup process that verifies the player's identity and ensures they're of legal age required to gamble. During the account registration process, the player may provide their login and identity information (username, password, email address, mobile phone number, address, etc). Additionally, during the account registration process the player may be required to take a photo of their driver's license in order to validate their age. For example, a player may use their mobile device to take a selfie in order to perform a liveliness check, etc. During the account registration process the system back-end may even leverage a solution like LexisNexis in order to verify the player attempting to register is actually a real person by validating the name against their provided address, and other personal details.

Once a player's account is registered, the player may have to fund their wallet in some manner. In some embodiments, the player may do this using their mobile device. In some other embodiments, the player could swipe or tap their credit or debit card to the in-seat display associated with their seat on the aircraft. In another embodiment, they could provide their credit or debit card to the flight attendant, who can credit their account.

Once the player has established their account (which could be created on-aircraft or off aircraft before the flight), they may then login to their account on the aircraft in order to play a gambling game. If the player wishes to play the gambling game from their personal mobile device, it may be expected that the player would login to their account using traditional mechanisms, such as by providing their username and password to the website of the gambling application for the aircraft. If the player wishes to play a gambling game using the screen associated with the seat back of the seat in front of them, then a player may not choose to login to their account using the on-screen display as other persons in adjacent seats may shoulder surf and steal that player's password. In some embodiments, a login approach may involve the player tapping their phone and presenting information associated with their account to the in-seat display device using BLE or NFC communications from an app on their mobile device. In some embodiments, an app or web page on the player's mobile device associated with the gambling system may provide a short code that may be valid for a short period of time and that may be entered into the on-seat device in order to authenticate.

In some embodiments, players on the flight may be entered into a leaderboard so that other passengers can learn who is doing the best while playing gambling games on the flight. In some embodiments, players on the flight may be eligible to play a slot tournament, such as a timed tournament, and the players playing the tournament may be displayed at various times. Such times include on passenger demand and at an end of the tournament, among others. In some embodiments, the leaderboard content can even take priority over other user content upon certain events. In some embodiments, the leaderboard may represent total amount wagered, total amount won, total points earned, total jackpots won, and/or total amount lost, among others, during the flight.

In some embodiments, the player or players who are at certain positions on the leaderboard (e.g., the top positions) may get certain awards given to them when the leaderboard ends and/or at the end of a timed tournament round and/or the end of the flight). Award examples include, but are not limited to: airline miles, airline tier status, and/or discounts on aircraft amenities, such as food, alcohol, among others.

When a player hits a jackpot, the celebration of the jackpot may traditionally be contained to that player's display. However, the entertainment value on an aircraft with multiple passengers may provide that the jackpot notice may be shared with multiple passengers. For example, winning players may desire some notoriety or praise from hitting a jackpot. In some embodiments, when a player wins a jackpot, their name, and/or seat number, or some other unique indicator of that player (ex: an avatar, etc.) may be made visible on other displays on the aircraft so that other players may learn about the jackpot including the winning player and/or the winning amount, among others. In some embodiments, the lights on the aircraft may be coordinated to celebrate the winning player. For example, the overhead lights above all aircraft passengers may light up and converge on the winning player in some form of animation sequence. In some other embodiments, the jackpot may place the player's name on a leaderboard or other special list.

Hitting a jackpot on a flight may also make the player eligible for certain special privileges. In some embodiments, a jackpot hit event may be published to the aircraft crew so that champagne could be sent to the player at their seat, and potentially in any surrounding seats to toast the player for their win. In some embodiments, the crew of the aircraft could be notified of the jackpot and encourage only players who win the jackpot to get up and depart the plane ahead of other passengers when the plane arrives at the gate.

Hitting certain jackpots and/or game winning events may also make a player eligible for certain marketing rewards. For example, if a player hits a jackpot over $1000, they may get their flight ticket value refunded. In some other embodiments, they may receive free drinks on the plane, and/or an upgraded meal, and/or the ability to move from economy class to first class (if there's an open seat). In some embodiments, the player may be able to board their next flight earlier than what would be afforded to them by their current airline tier status or one afforded to them by their current flight ticket.

In an example of embodiments provided herein, a first couple of passengers flying on a vacation to Hawaii from Colorado may be offered an in-flight application when over Nevada to allow them to play Class III casino games. Using their smartphone pay app, they both enter some money that goes into a cashless wallet system. When the plane is 10 minutes away from entering California, the in-game application notifies the couple of passengers that the legal jurisdiction change will apply and thus the last session is ended. A small information panel may then open and describe that California only allows gaming on Tribal land and will introduce the next library of content allowed for international airspace. Since the wallet is going from a Class II to Class III jurisdiction, they may be offered to cashout or place the funds in escrow to be available in the next jurisdiction.

In another example, a second pair of passengers may be flying from Las Vegas back to Washington state after their vacation. They both decide to play some games on the hour and a half flight towards the northwest of the coast. When approaching Oregon, a notification displays an indication that they will soon be in a Class II gaming jurisdiction through lottery. Instructions along with a library of available games for the area may be provided. A first passenger of the second pair of passengers decides to cashout, and the funds may be deposited back to her casino or other type of account. The second passenger of the second pair of passengers decides to continue to play, and the session ends and shows her how to play while the funds are in escrow and a gaming session with Oregon State Lottery is initiated.

Figure 1:
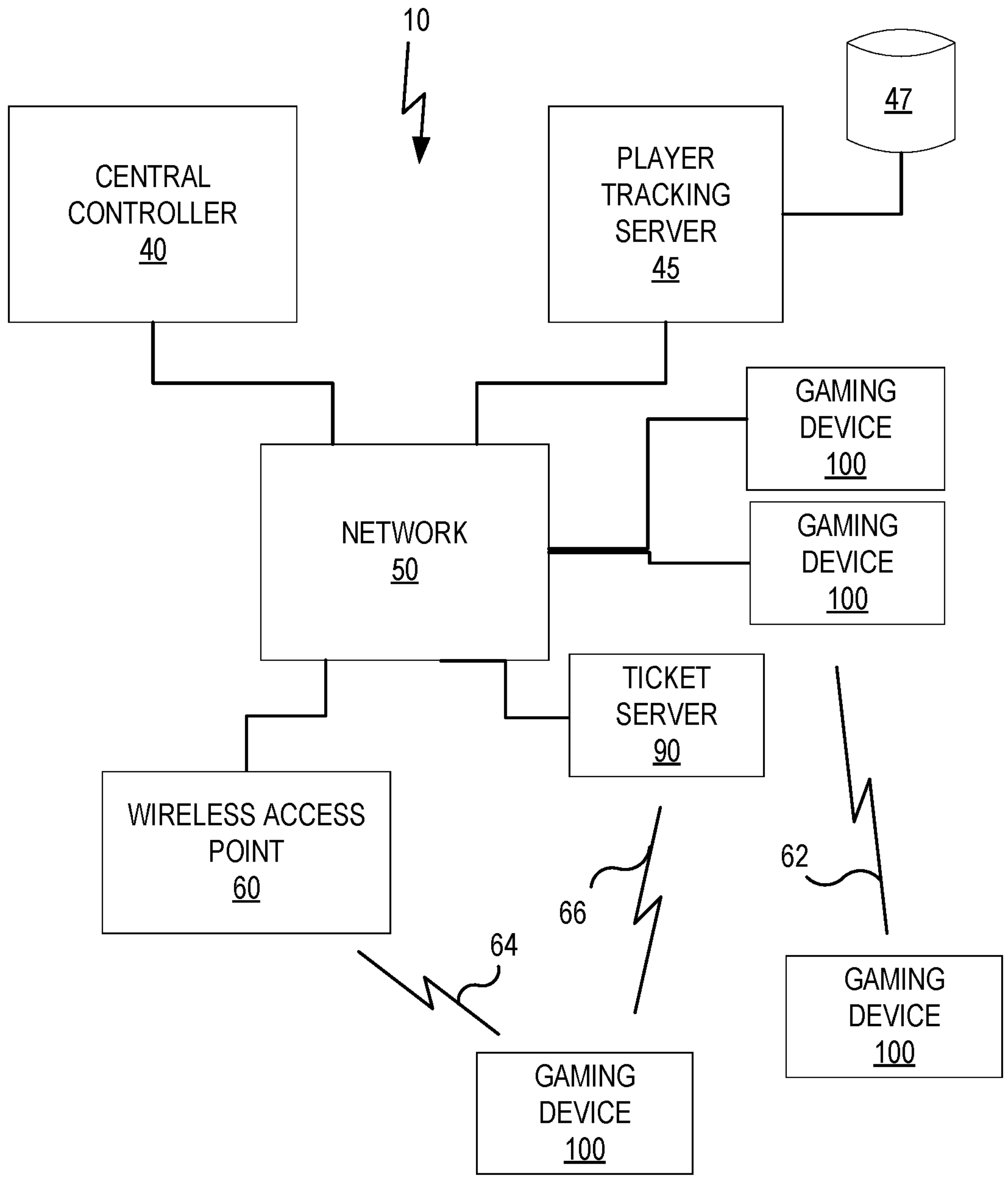
FIG. 1 is a schematic block diagram illustrating a network configuration for a plurality of gaming devices according to some embodiments.

Referring now to FIG. 1, a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
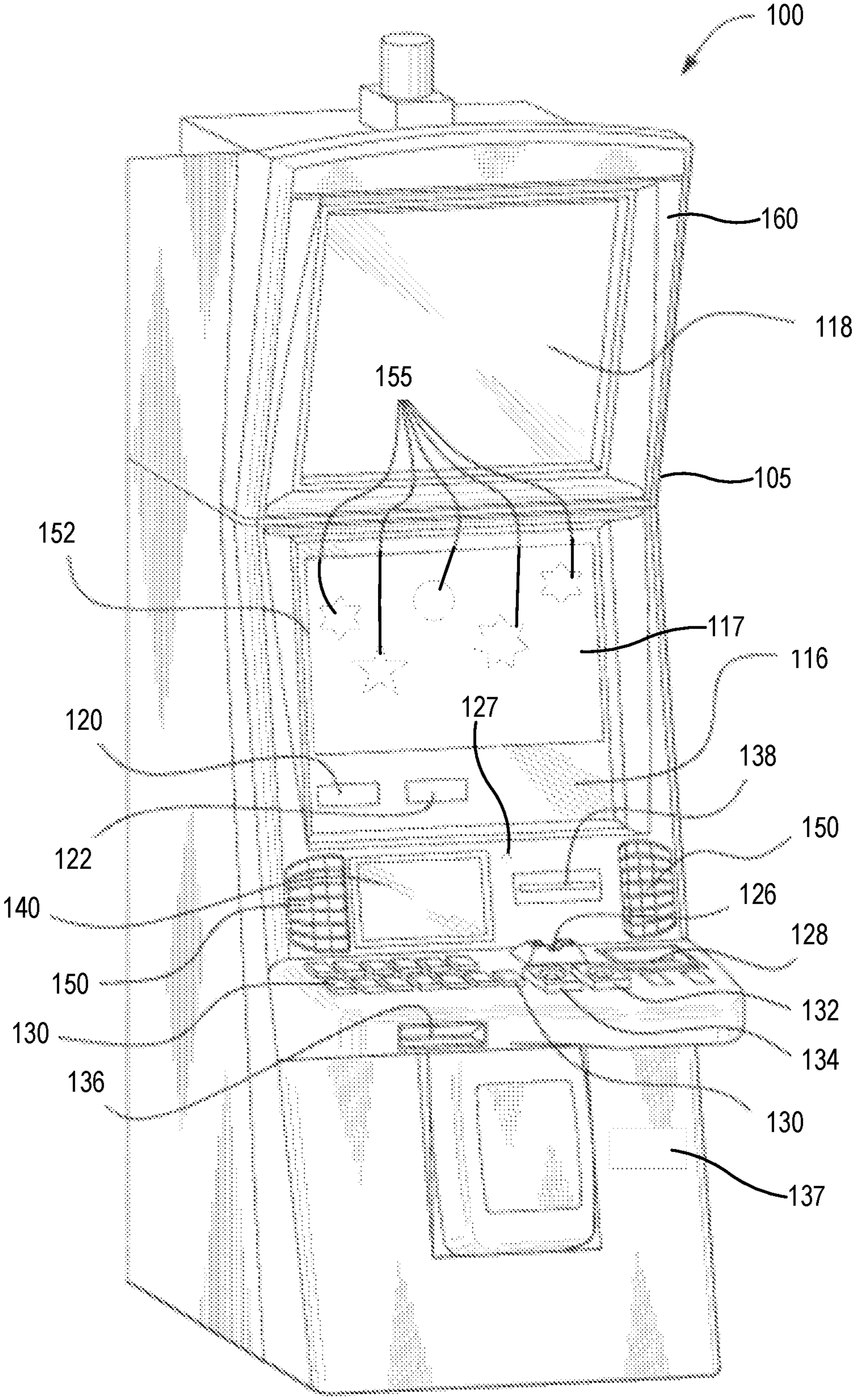
FIG. 2A is a perspective view of a gaming device that can be configured according to some embodiments.
Figure 2B:
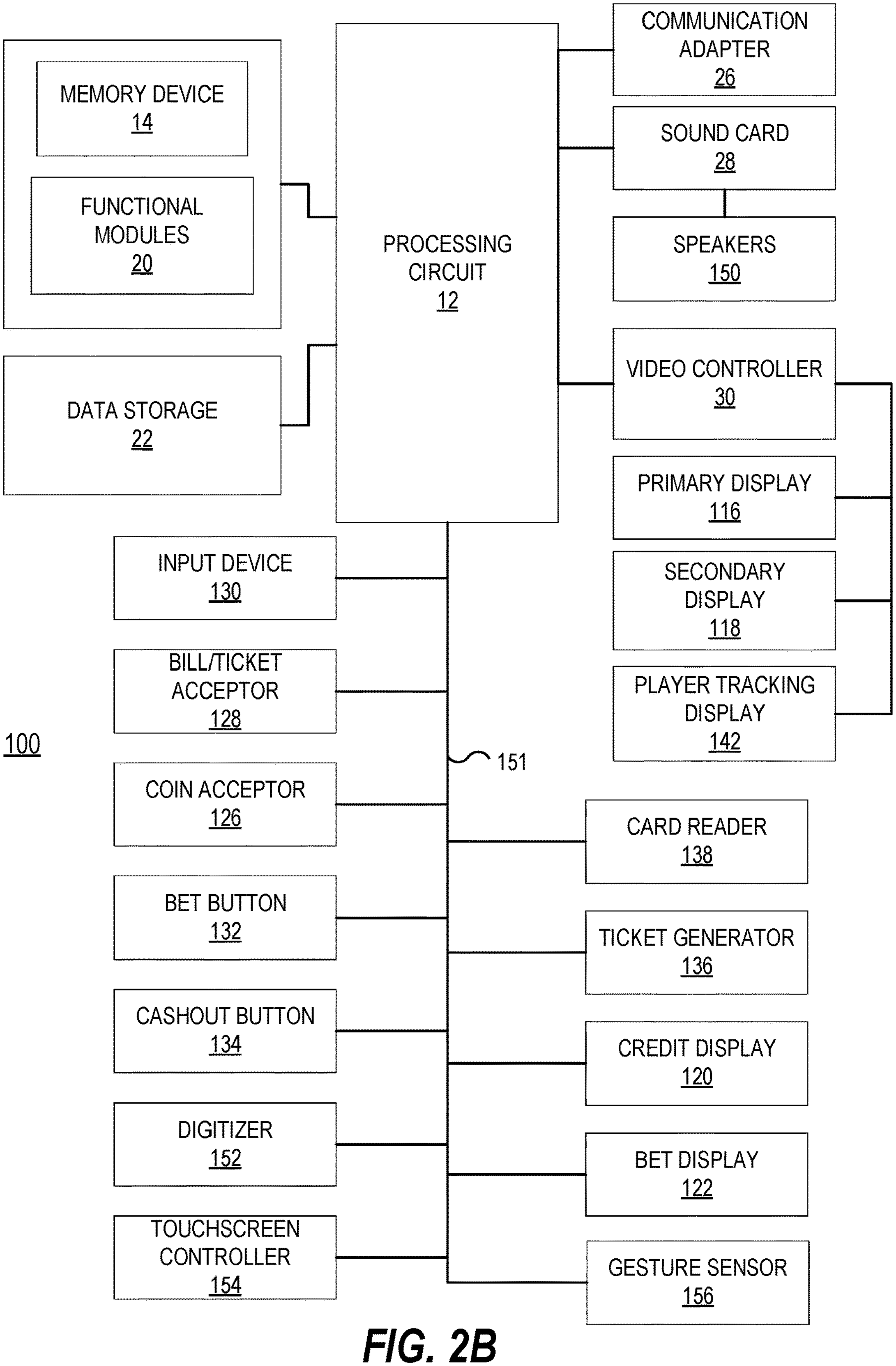
FIG. 2B is a schematic block diagram illustrating an electronic configuration for a gaming device according to some embodiments.
Figure 2C:
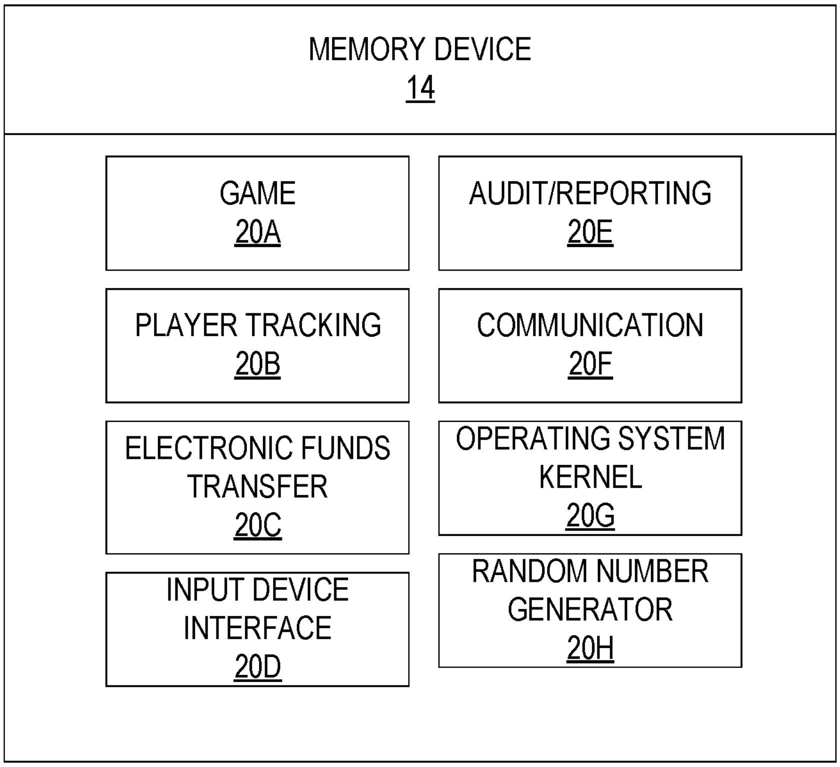
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
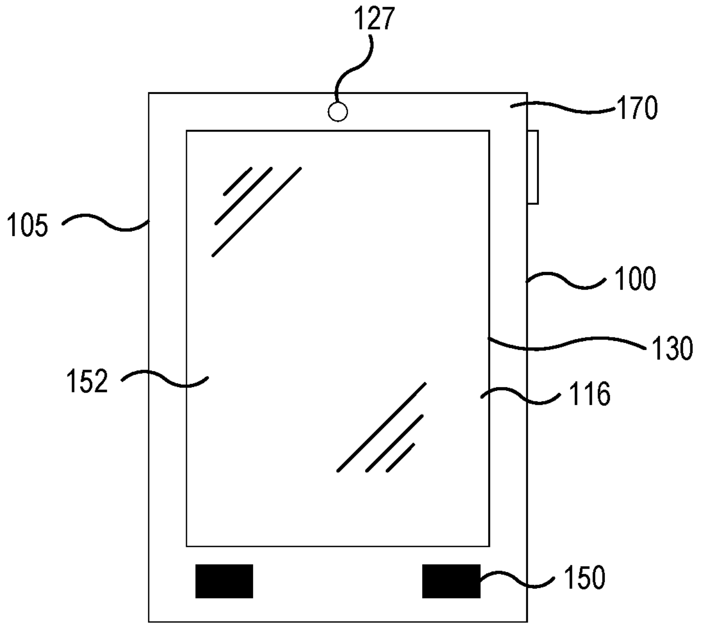
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
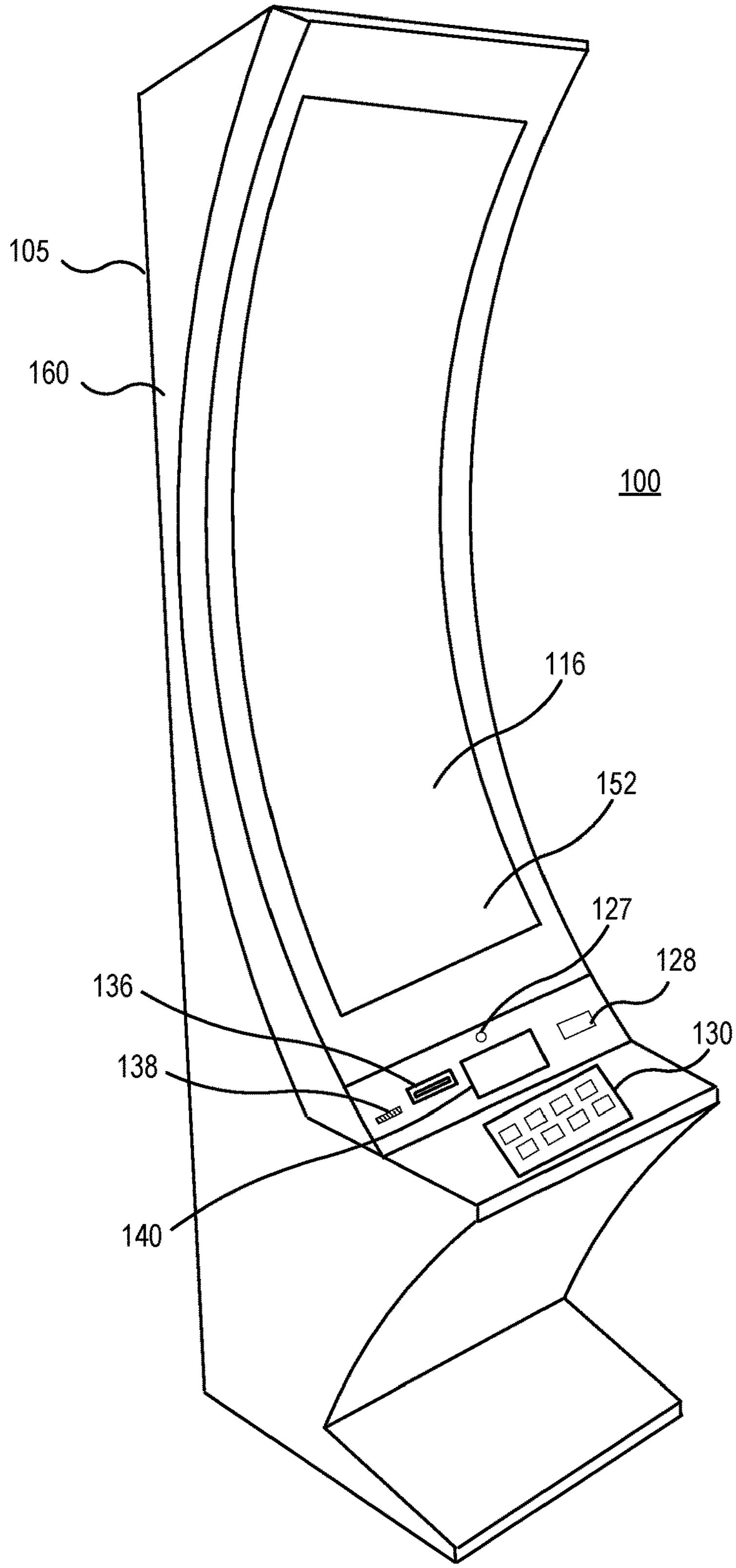
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 10:
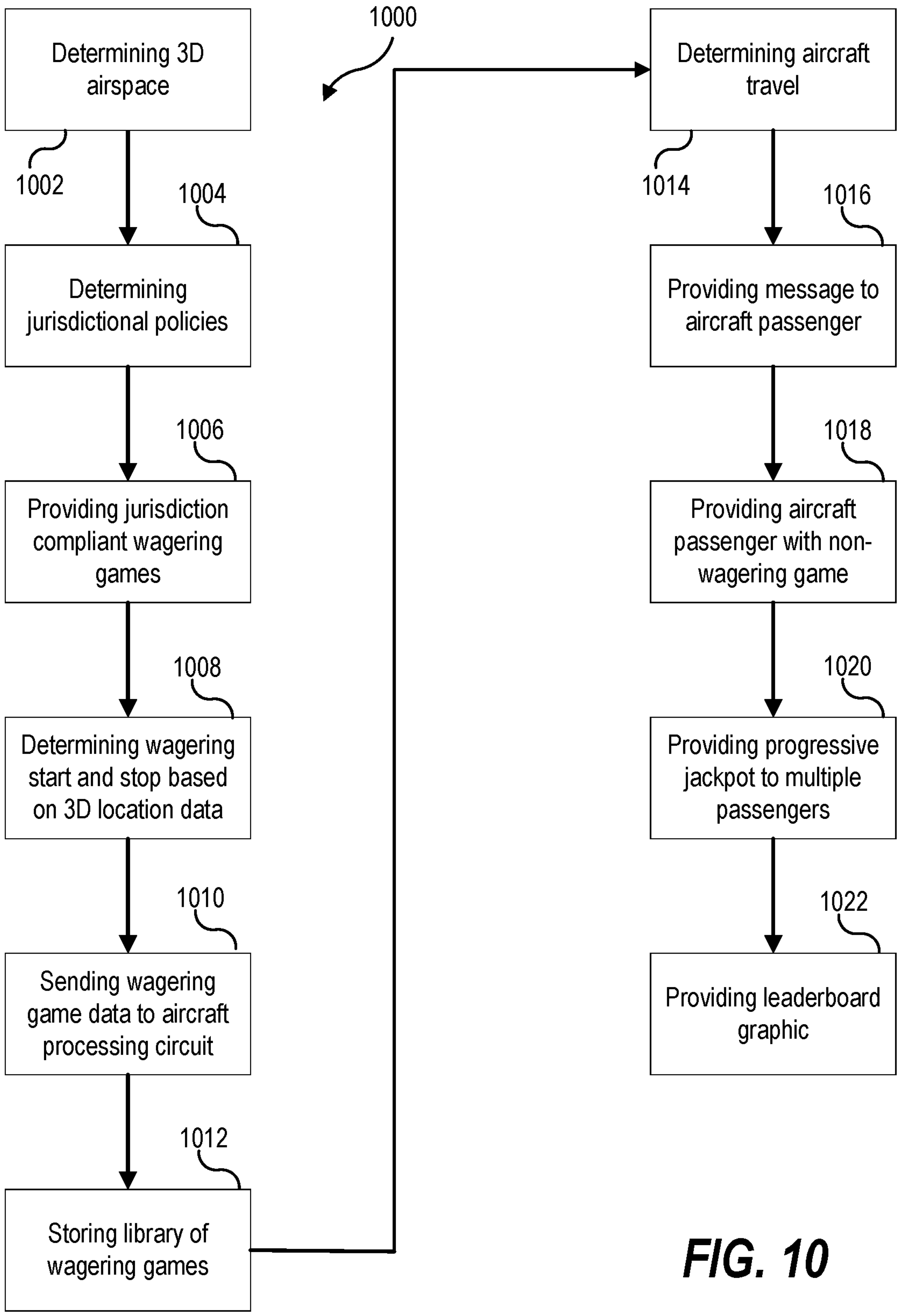
FIG. 10 is a flowchart illustrating operations of systems/methods of air travel using a wagering game, according to some embodiments.

Reference is now made to FIG. 10, which is a flowchart illustrating operations of systems/methods of air travel using a wagering game, according to some embodiments. A system disclosed herein includes a communication interface, a processing circuit, and a memory coupled to the processing circuit. The memory includes machine readable instructions that, when executed by the processing circuit, cause the processing circuit to perform operations of determining (block 1002) three-dimensional (3D) airspace location data corresponding to an aircraft. Operations further include, based on the 3D airspace location data, determining (block 1004) jurisdictional policies regarding providing a jurisdiction compliant wagering game to an aircraft passenger and providing (block 1006) one of the jurisdiction compliant wagering games to the aircraft passenger.

In some embodiments, the processing circuit causes the jurisdiction compliant wagering game to determine (block 1008) a wagering session start and a wagering session end based on the 3D airspace location data.

Some embodiments provide that the processing circuit is further caused to send (block 1010) wagering game data to an aircraft wagering processing circuit that is on the aircraft for display to and interaction with the aircraft passenger.

In some embodiments the processing circuit is configured to be located on the aircraft and is further caused to store (block 1012) a library of wagering games that comprise are the one of the jurisdiction compliant wagering games to be provided to the aircraft passenger.

Some embodiments provide that determining the 3D airspace location data causes the processing circuit to further determine multiple geographical zones that include a first geographical zone and a second geographical zone that is different from the first geographical zone. In some embodiments, the first geographic zone includes a first set of jurisdictional policies and the second geographic zone includes a second set of jurisdictional policies that are different from the first set of jurisdictional policies.

In some embodiments, the first geographical zone and the second geographical zone include geographical zones that are defined on a travel route of the aircraft and, responsive to the aircraft moving from one of the first geographic zone or the second geographic zone to the other of the first geographic zone or the second geographic zone, the jurisdiction compliant wagering game changes.

In some embodiments, the first geographical zone includes a first altitude that is above a threshold altitude and the second geographical zone includes a second altitude that is below the threshold altitude.

Some embodiments provide that the processing circuit is further caused to determine (block 1014) that the aircraft will be travelling from the first geographical zone to the second geographical zone. Embodiments further provide (block 1016) a message, via the communication interface, that informs the aircraft passenger that the first set of jurisdictional policies will not apply and that the jurisdiction compliant wagering games will be provided according to the second set of jurisdictional policies.

In some embodiments, providing one of the jurisdiction compliant wagering games to the aircraft passenger further includes select which of the jurisdiction compliant wagering games based on an amount of time that the aircraft is expected to remain in one of the geographical zones.

In some embodiments, providing one of the jurisdiction compliant wagering games to the aircraft passenger further includes transmitting the jurisdiction compliant wagering games to multiple graphical user interfaces (GUIs) that are associated with multiple aircraft passengers via the communication interface. In some embodiments, a portion of the GUIs is selectively enabled to receive the jurisdictional compliant wagering games based on aircraft passenger data that indicates that the aircraft passenger is qualified to receive the jurisdictional compliant wagering games.

Some embodiments provide that a first portion of the GUIs are selectively enabled to receive the jurisdictional compliant wagering games based on a first aircraft seating zone that includes the first set of jurisdictional policies and a second portion of the GUIs are selectively prevented from receiving the jurisdictional compliant wagering games based on a second aircraft seating zone that comprises the second set of jurisdictional policies.

Some embodiments provide that the processing circuit is further caused to communicate with a player account management system that registers and stores player account balances.

In some embodiments, the processing circuit is further configured to be communicatively coupled to an altimeter to determine three-dimensional (3D) airspace location data corresponding to the aircraft.

Some embodiments provide that, responsive to determining that the jurisdictional policies indicate that the aircraft is in a no wagering zone, the processing circuit is further caused to provide (block 1018) the aircraft passenger with a non-wagering game. In some embodiments, in response to determining that the jurisdictional policies indicate that the aircraft is in a no-wagering zone, the processing circuit is further caused to provide the aircraft passenger with an on-line wagering game.

In some embodiments, the processing circuit is further caused to provide (block 1020), to multiple aircraft passengers that include the aircraft passenger, a progressive jackpot corresponding to wagering that occurs during a portion of a flight of the aircraft and the plurality of aircraft passengers.

Some embodiments provide that the processing circuit is further caused to provide (block 1022), to multiple aircraft passengers that include the aircraft passenger, a leaderboard graphic that provides data corresponding to relative wagering performance of the plurality of aircraft passengers.

Figure 11:
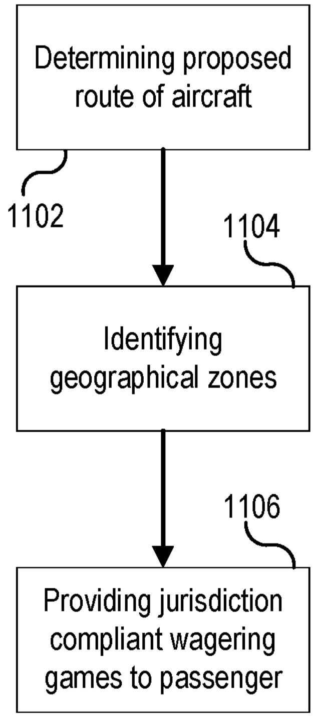
FIG. 11 is a flowchart illustrating operations of systems/methods of air travel using a wagering game, according to some embodiments.

Brief reference is now made to FIG. 11, which is a flowchart illustrating operations of systems/methods of air travel using a wagering game, according to some embodiments. According to some embodiments, operations include determining (block 1102) proposed route of an aircraft and identifying (block 1104) multiple geographical zones that include the proposed route of the aircraft and that each include different sets of jurisdictional policies corresponding to wagering games. Operations may include providing (block 1106) jurisdiction compliant wagering games to a passenger on the aircraft based on jurisdictional policies that correspond to one of the geographical zones.

Figure 12:
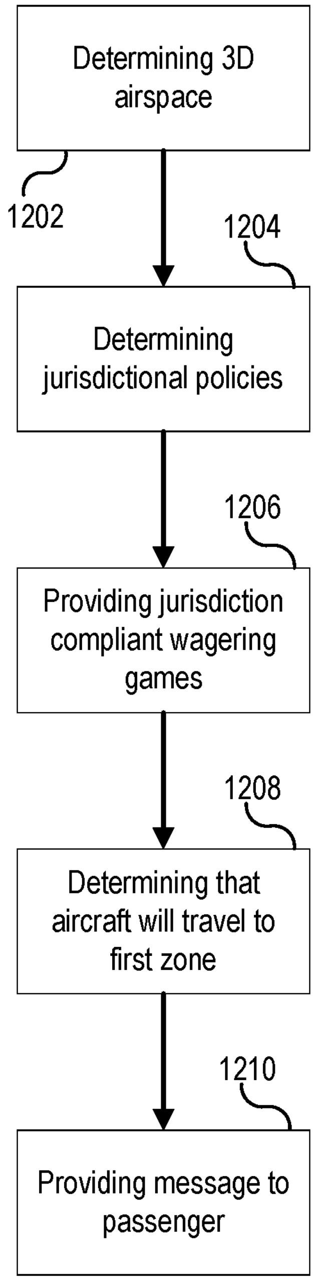
FIG. 12 is a flowchart illustrating operations of systems/methods of air travel using a wagering game, according to some embodiments.

Brief reference is now made to FIG. 12, which is a flowchart illustrating operations of systems/methods of air travel using a wagering game, according to some embodiments. According to FIG. 12, a system includes a communication interface, a processing circuit and a memory coupled to the processing circuit. The memory includes machine readable instructions that, when executed by the processing circuit, cause the processing circuit to determine (block 1202) three-dimensional (3D) airspace location data corresponding to an aircraft. The processing circuit is further caused to, based on the 3D airspace location data, determine (block 1204) jurisdictional policies regarding providing jurisdiction compliant wagering games to an aircraft passenger. The processing circuit is further caused to provide (block 1206) one of the jurisdiction compliant wagering games to the aircraft passenger. In some embodiments determining the 3D airspace location data causes the processing circuit to further determine multiple geographical zones that include a first geographical zone and a second geographical zone that is different from the first geographical zone. The first geographic zone includes a first set of jurisdictional policies and the second geographic zone includes a second set of jurisdictional policies that are different from the first set of jurisdictional policies. In some embodiments, the first geographical zone includes a first altitude that is above a threshold altitude and the second geographical zone includes a second altitude that is below the threshold altitude.

Some embodiments provide that the processing circuit is further caused to determine (block 1208) that the aircraft will be travelling from the first geographical zone to the second geographical zone. Some embodiments include providing (block 1210) a message, via the communication interface, that informs the aircraft passenger that the first set of jurisdictional policies will not apply and that the jurisdiction compliant wagering games will be provided according to the second set of jurisdictional policies.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device arc implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments. once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof.

Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a communication interface;

a processing circuit; and a memory coupled to the processing circuit, the memory comprising machine readable instructions that, when executed by the processing circuit, cause the processing circuit to:

determine three-dimensional (3D) airspace location data corresponding to an aircraft;

based on the 3D airspace location data, determine jurisdictional policies regarding providing a jurisdiction compliant wagering game to an aircraft passenger; and provide, via a game device, one of the jurisdiction compliant wagering games to the aircraft passenger, wherein the processing circuit is further configured to be communicatively coupled to an altimeter to determine the 3D airspace location data corresponding to the aircraft.

2. The system of claim 1, wherein the processing circuit is configured to provide the jurisdiction compliant wagering game to determine a wagering session start and a wagering session end based on the 3D airspace location data.

3. The system of claim 1, wherein the processing circuit is further caused to send wagering game data to an aircraft wagering processing circuit that is on the aircraft for display to and interaction with the aircraft passenger.

4. The system of claim 1, wherein the processing circuit is configured to be located on the aircraft and is further caused to store a library of wagering games that comprise the one of the jurisdiction compliant wagering games to be provided to the aircraft passenger.

5. The system of claim 1, wherein determining the 3D airspace location data causes the processing circuit to further determine a plurality of geographical zones that comprise a first geographical zone and a second geographical zone that is different from the first geographical zone, and wherein the first geographical zone comprises a first set of jurisdictional policies and the second geographical zone comprises a second set of jurisdictional policies that are different from the first set of jurisdictional policies.

6. The system of claim 5, wherein the first geographical zone and the second geographical zone comprise geographical zones that are defined on a travel route of the aircraft, and wherein responsive to the aircraft moving from one of the first geographical zone or the second geographical zone to the other of the first geographical zone or the second geographical zone, the jurisdiction compliant wagering game changes.

7. The system of claim 5, wherein the first geographical zone comprises a first altitude that is above a threshold altitude and the second geographical zone comprises a second altitude that is below the threshold altitude.

8. The system of claim 5, wherein the processing circuit is further caused to: determine that the aircraft will be travelling from the first geographical zone to the second geographical zone; and provide a message, via the communication interface, that informs the aircraft passenger that the first set of jurisdictional policies will not apply and that the jurisdiction compliant wagering games will be provided according to the second set of jurisdictional policies.

9. The system of claim 5, wherein the processing circuit to provide one of the jurisdiction compliant wagering games to the aircraft passenger is further caused to select which of the jurisdiction compliant wagering games based on an amount of time that the aircraft is expected to remain in one of the plurality of geographical zones.

10. The system of claim 5, wherein the processing circuit to provide one of the jurisdiction compliant wagering games to the aircraft passenger is further caused to transmit the jurisdiction compliant wagering games to a plurality of graphical user interfaces (GUIs) that are associated with a plurality of aircraft passengers via the communication interface.

11. The system of claim 10, wherein a portion of the plurality of GUIs are selectively enabled to receive the jurisdiction compliant wagering games based on aircraft passenger data that indicates that the aircraft passenger is qualified to receive the jurisdiction compliant wagering games.

12. The system of claim 10, wherein a first portion of the plurality of GUIs are selectively enabled to receive the jurisdiction compliant wagering games based on a first aircraft seating zone that comprises the first set of jurisdictional policies and a second portion of the plurality of GUIs are selectively prevented from receiving the jurisdiction compliant wagering games based on a second aircraft seating zone that comprises the second set of jurisdictional policies.

13. The system of claim 1, wherein the processing circuit is further caused to communicate with a player account management system that registers and stores player account balances.

14. The system of claim 1, wherein, responsive to determining that the jurisdictional policies indicate that the aircraft is in a no wagering zone, the processing circuit is further caused to provide the aircraft passenger with a non-wagering game.

15. The system of claim 14, wherein responsive to determining that the jurisdictional policies indicate that the aircraft is in a wagering zone, the processing circuit is further caused to provide the aircraft passenger with an on-line wagering game.

16. The system of claim 5, wherein the processing circuit is further caused to provide, to a plurality of aircraft passengers that includes the aircraft passenger, a progressive jackpot corresponding to wagering that occurs during a portion of a flight of the aircraft by the plurality of aircraft passengers.

17. The system of claim 5, wherein the processing circuit is further caused to provide, to a plurality of aircraft passengers that includes the aircraft passenger, a leaderboard graphic that provides data corresponding to relative wagering performance of the plurality of aircraft passengers.

* * * * *